United States Patent
Kumar

(10) Patent No.: US 10,593,446 B2
(45) Date of Patent: Mar. 17, 2020

(54) APPARATUS FOR PROVIDING AN ARC DIVERTER FOR COVERED OVERHEAD CONDUCTORS AND RELATED ASSEMBLIES AND METHODS

(71) Applicant: TE Connectivity Corporation, Berwyn, PA (US)

(72) Inventor: Senthil A. Kumar, Morrisville, NC (US)

(73) Assignee: TE Connectivity Corporation, Berwyn, PA (US)

(*) Notice: Subject to any disclaimer, the term of this patent is extended or adjusted under 35 U.S.C. 154(b) by 78 days.

(21) Appl. No.: 15/495,456

(22) Filed: Apr. 24, 2017

(65) Prior Publication Data
US 2017/0309377 A1    Oct. 26, 2017

Related U.S. Application Data

(60) Provisional application No. 62/327,242, filed on Apr. 25, 2016.

(51) Int. Cl.
*H01B 17/00*    (2006.01)
*H01B 17/56*    (2006.01)
(Continued)

(52) U.S. Cl.
CPC ........... *H01B 17/56* (2013.01); *H01B 9/008* (2013.01); *H01B 17/00* (2013.01); *H01B 17/42* (2013.01); *H02G 7/05* (2013.01)

(58) Field of Classification Search
CPC .. H02G 7/05; H02G 7/12; H02G 7/20; H02G 15/117; H02G 7/06; H02G 7/00;
(Continued)

(56) References Cited

U.S. PATENT DOCUMENTS 1,598,155 A * 8/1926 Salisbury ................. H02G 7/00
174/5 R
4,398,057 A * 8/1983 Shankle ................. H01B 17/22
174/2

(Continued)

FOREIGN PATENT DOCUMENTS

DE     91 09 172     10/1991
EP     0 387 865     9/1990
JP     S50 129899     10/1975

OTHER PUBLICATIONS

International Preliminary Report on Patentability for PCT/US20171029146 dated Nov. 8, 2018, 8 pages.

(Continued)

*Primary Examiner* — Pete T Lee
(74) *Attorney, Agent, or Firm* — Myers Bigel, P.A.

(57) ABSTRACT

Described herein is a protective cover assembly for an electrical cable mounted on an insulator. The assembly includes an insulator cover including a cover body covering the electrical cable and the insulator and an electrically conductive arc diverter. The arc diverter is elongated in an axial direction that is parallel to a center axis of the electrical cable and is attached to an outer surface of the electrical cable at a portion of the electrical cable that is covered by the insulator cover such that a portion of the arc diverter is positioned below and covered by the insulator cover and another portion of the arc diverter extends past a terminal end of the insulator cover with an end of the arc diverter being spaced apart from the terminal end of the insulator cover in the axial direction.

21 Claims, 11 Drawing Sheets

(51) Int. Cl.
*H01B 9/00* (2006.01)
*H02G 7/05* (2006.01)
*H01B 17/42* (2006.01)

(58) Field of Classification Search
CPC ........ H02G 15/22; H02G 15/20; H02G 15/02;
H02G 15/06; H02G 9/00; H02G 9/10;
H02G 7/02; H02G 7/08; H02G 3/26;
H02G 7/18; H02G 3/081; H02G 3/14;
H01R 4/66; H01R 4/643; H01B 7/00;
H01B 17/34; H01B 17/36; H01B 7/1855;
H01B 7/186; H01B 7/1865; H01B 7/187;
H01B 7/1875; H01B 3/00; H01B 3/30;
H01B 3/305; H01B 3/306; H01B 3/308;
H01B 3/32; H01B 3/42; H01B 3/421;
H01B 3/422; H01B 3/423; H01B 3/425;
H01B 3/44; H01B 3/46; H01B 17/00;
H01B 1/00; H01B 17/06; H01B 17/16;
H01B 17/22; H01B 17/58; H01B 17/38;
H02B 1/28; H05K 5/00; E04H 12/24;
H01L 23/48
See application file for complete search history.

(56) References Cited

U.S. PATENT DOCUMENTS

| | | |
|---|---|---|
| 6,730,852 B1 | 5/2004 | Puigcerver et al. |
| 2005/0191910 A1* | 9/2005 | Bertini ................ H01R 13/523 |
| | | 439/676 |
| 2016/0172829 A1 | 6/2016 | Hiller et al. |
| 2016/0233010 A1 | 8/2016 | Hiller et al. |

OTHER PUBLICATIONS

International Search Report and Written Opinion for PCT/US2017/029146 dated Aug. 7, 2017, 14 pages.

* cited by examiner

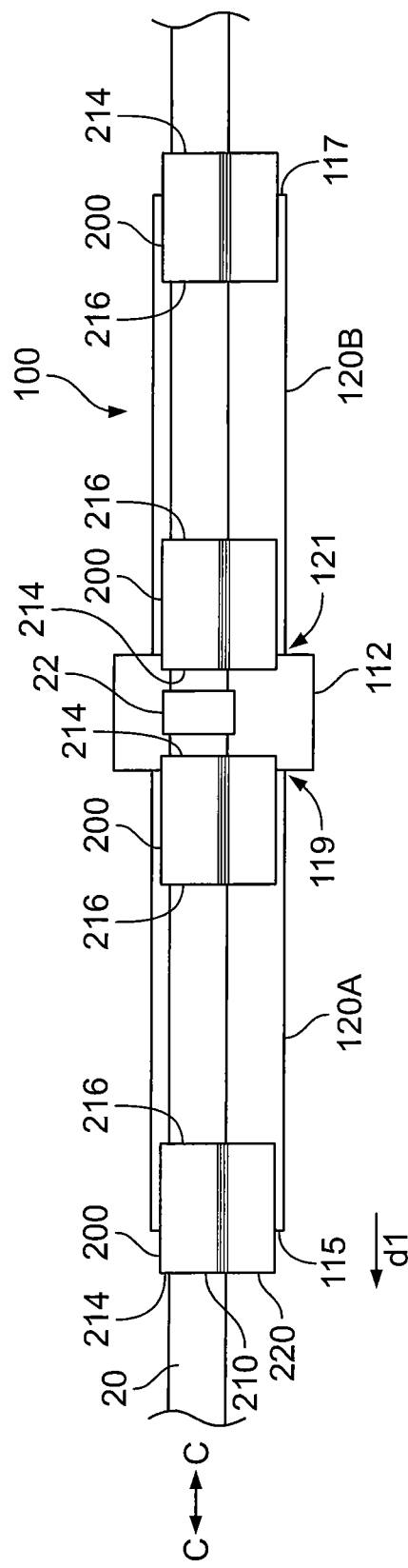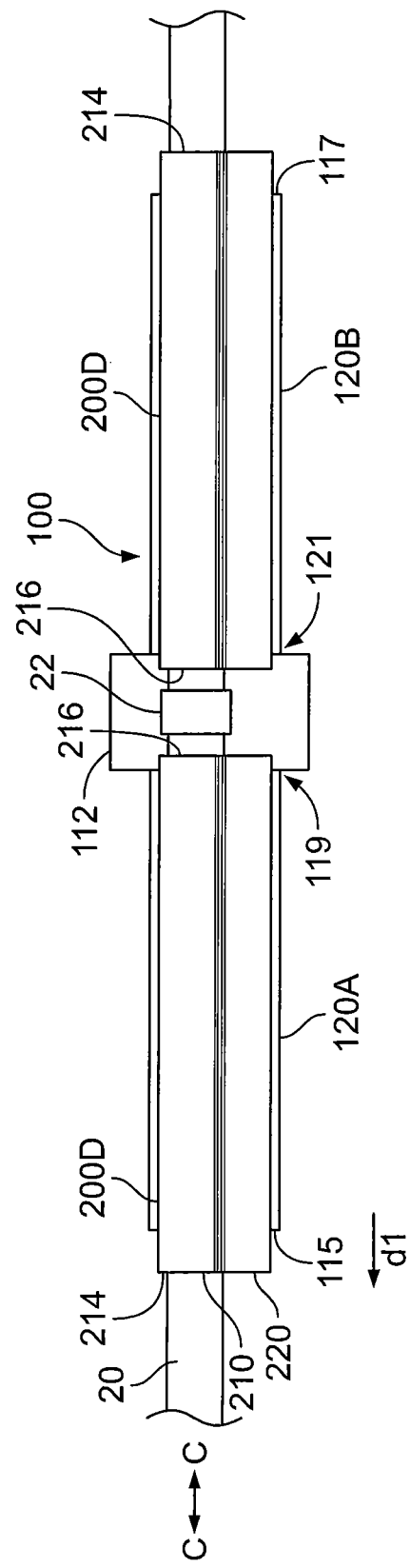

APPARATUS FOR PROVIDING AN ARC DIVERTER FOR COVERED OVERHEAD CONDUCTORS AND RELATED ASSEMBLIES AND METHODS

RELATED APPLICATIONS

This application claims priority from U.S. Provisional Application No. 62/327,242, filed Apr. 25, 2016, the disclosure of which is hereby incorporated herein in its entirety.

FIELD OF THE INVENTION

The present invention relates to electrical arc protection of overhead conductors having protective covers and, more particularly, to arc diverters for overhead conductors used in distribution lines, such as electrical power distribution lines.

BACKGROUND OF THE INVENTION

Support structures, such as utility poles, are often used to suspend electrical lines, such as power distribution lines, above the ground. These support structures are generally located outdoors and may be of a variety of different configurations to suspend one or more lines. One problem with such lines, particularly with power distribution lines that transmit electrical power at high voltages, is that birds or other animals may land or climb onto the lines. Such contact of distribution lines by animals, particularly adjacent the support structure, may cause a short or electrical flashover allowing current flow through the animal, which may cause a power outage or other problem with the power distribution system.

For example, it is known that birds from time to time perch on support structures such as utility poles. For certain birds, their wing span is great enough to contact two parallel lines or otherwise create an electrical flashover during takeoff or landing. In addition to harming the bird, such an electrical flashover can also cause a power outage or other problem with the power distribution system.

A solution that may reduce the likelihood of an electrical flashover due to animal incursion onto power distribution structures may be provided in U.S. Patent Application Publication No. 2016/0233010, which is incorporated by reference in its entirety as if fully set forth herein. For example, brief reference is made to FIG. 1, which is a top, rear perspective view of a protective cover assembly as discussed therein.

With reference to FIGS. 1 and 2, a protective cover assembly 101 includes an insulator cover 100 and a retaining pin 140. The insulator cover 100 includes a cover body 110, a mounting bracket 130, fasteners 139, and a plurality (as shown, four) connector members or clips 150.

The cover body 110 has a longitudinal axis L-L. The cover body 110 includes a central or main body or shroud section 112 and a pair of opposed, laterally extending, generally inverted U-shaped body extensions or legs 120. Generally, the main body section 110 provides coverage for the electrically conductive components of an insulator and the overlying portion of a conductor 20, and the legs 120 provide coverage for more extant opposed portions of the conductor. The insulator cover 100 is adapted to receive an insulator and portions of the conductor such that at least a portion of the conductor 20 generally extends along a lengthwise conductor axis C-C.

The main body section 112 defines a central insulator cavity 114A to receive the insulator, a bottom opening 114B communicating and contiguous with the cavity 114A, and a rear end slot communicating and contiguous with the cavity 114A and the bottom opening 114B. The main body section 112 further includes a front end wall opposite the rear end slot, and a top wall opposite the bottom opening 114B.

The legs 120 each define a leg channel 122A to receive the conductor. An elongate bottom opening 122B communicates and is contiguous with each leg channel 122A. Each channel 122A and its bottom opening 122B terminate at the insulator cavity 114A and the main body bottom opening 114B at one end, and at a distal end opening 122C at the other end.

While protective cover assemblies may reduce electrical flashovers due to wildlife, such as birds, when arcs between conductors do occur, significant conductor damage may occur when an arc is present at the same point on a conductor for a prolonged period of time. For example, reference is now made to FIG. 2, which is a schematic side view of an arc travelling between two conductors that include protective covers. First and second conductors 20A and 20B are covered using insulator covers 100A and 100B, respectively. The insulator covers 100A and 100B may include bottom openings 114B and/or 122B.

As illustrated, an electrical arc may occur between conductors 20A and 20B. Each of the lines 90, represents an arc location at a different time interval t0-t5. For example, the arc 90_0 may represent the arc location at the time the arc occurs t0. As the arc travels, at time t1 the arc location 90_1 may be at different points along both of the conductors 20A and 20B relative to the arc location 90_0. Continuing, as the arc travels, at time t2, the arc location 90_2 may be at still different points along both of the conductors 20A and 20B relative to the previous arc locations 90_0 and 90_1.

However, as the arc travels, at time t3, the arc location 90_3 may be at a different location on conductor 20A than at previous times t042, but may stay at generally the same location on conductor 20B as the location at time t2. The reason that the arc may travel along conductor 20A is that the insulator cover 100A includes bottom opening 114B and/or 122B. As such, the insulating cover does not interrupt the movement of the arc along conductor 20A. In contrast, since the insulator cover 100B is closed at the top and sides, the movement of the arc is significantly reduced and the arc location along conductor 20B is substantively unchanged between times t2 and t3. Similarly, at times t4 and t5, the arc locations 90_4 and 90_5 illustrate that the arc continues to move along conductor 20A, but stays at the same location on conductor 20B. The result is that the arc may be located at the same point along conductor 20B for a prolonged time period (t2-t5), which may result in significant damage to the conductor 20B.

SUMMARY

Some embodiments of the present invention are directed to a protective cover assembly for an electrical cable mounted on an insulator. The assembly includes an insulator cover including a cover body covering the electrical cable and the insulator and an electrically conductive arc diverter. The arc diverter is elongated in an axial direction that is parallel to a center axis of the electrical cable and is attached to an outer surface of the electrical cable at a portion of the electrical cable that is covered by the insulator cover such that a portion of the arc diverter is positioned below and covered by the insulator cover and another portion of the arc diverter extends past a terminal end of the insulator cover with an end of the arc diverter being spaced apart from the terminal end of the insulator cover in the axial direction.

Some other embodiments of the present invention are directed to a method of providing an arc protection of an electrical cable that is mounted on an insulator. The method includes: providing an insulator cover including a cover body covering the electrical cable and the insulator; and installing an electrically conductive arc diverter that is elongated in an axial direction that is parallel to a center axis of the electrical cable by attaching the arc diverter to an outer surface of the electrical cable at a portion of the electrical cable that is covered by the insulator cover such that a portion of the arc diverter is positioned below and covered by the insulator cover and another portion of the arc diverter extends past an end of the insulator cover with an end of the arc diverter being spaced apart from the end of the insulator cover in the axial direction.

Some other embodiments of the present invention are directed to a device for diverting a traveling electrical arc. The device includes an electrically conductive arc diverter that is elongated in an axial direction that is parallel to a center axis of an electrical cable and that is configured to be attached to an outer surface of the electrical cable at a portion of the electrical cable that is covered by an insulator cover in an installed position. In the installed position, a portion of the arc diverter is positioned below and covered by the insulator cover and another portion of the arc diverter extends past an end of the insulator cover such that an end of the arc diverter is spaced apart from the end of the insulator cover in the axial direction.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

The accompanying figures are included to provide a further understanding of the present invention, and are incorporated in and constitute a part of this specification. The drawings illustrate some embodiments of the present invention and, together with the description, serve to explain principles of the present invention.

FIG. 6 is a schematic side view of multiple arc diverters on a conductor with a cut-away view of an insulator cover according to some embodiments of the present invention.

FIG. 7 is a schematic side view of continuous arc diverters on a conductor with a cut-away view of an insulator cover according to some embodiments of the present invention.

DETAILED DESCRIPTION OF EMBODIMENTS OF THE INVENTION

Figure 1:
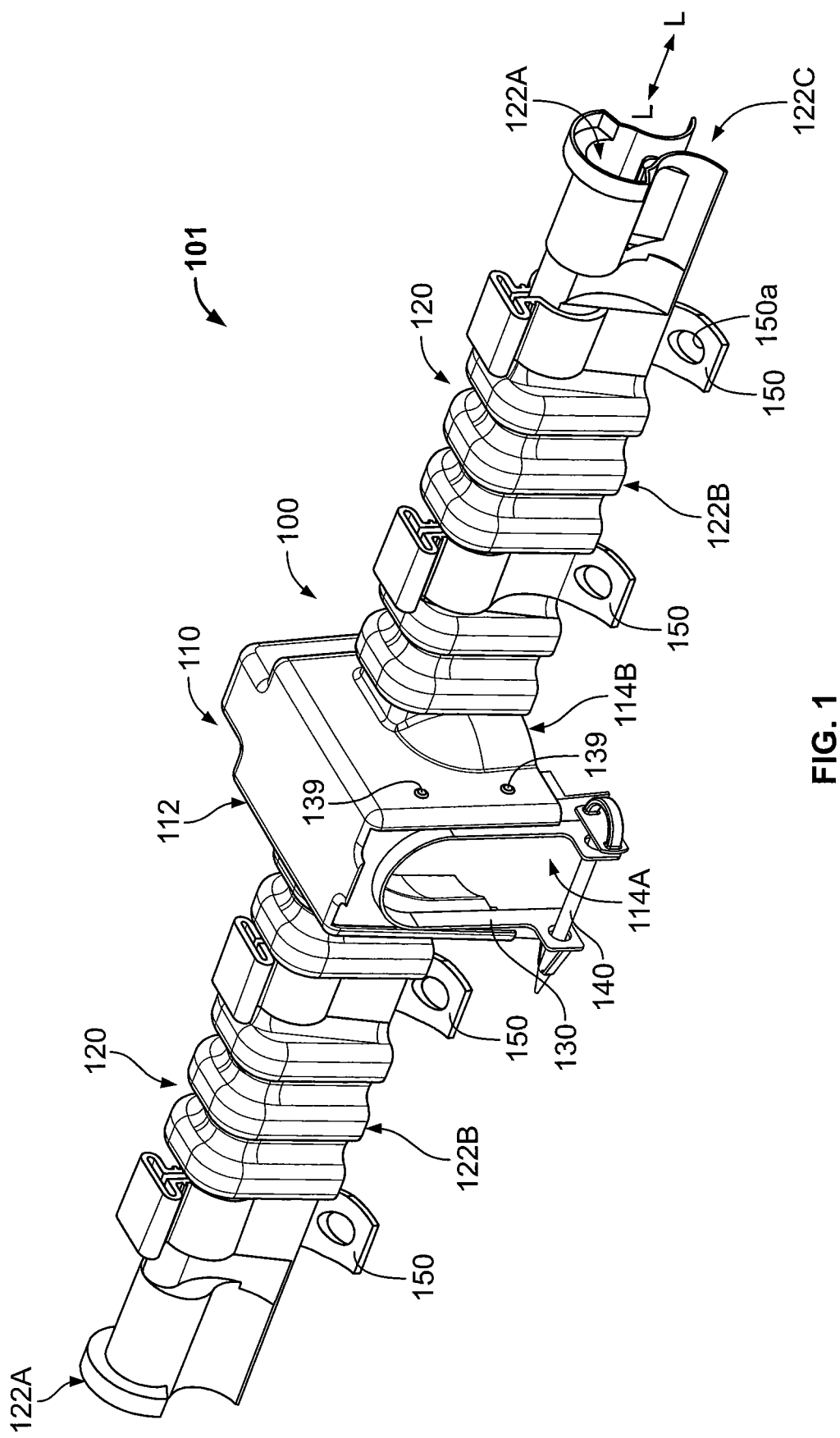
FIG. 1 is a top, rear perspective view of a conventional protective cover assembly.
Figure 2:
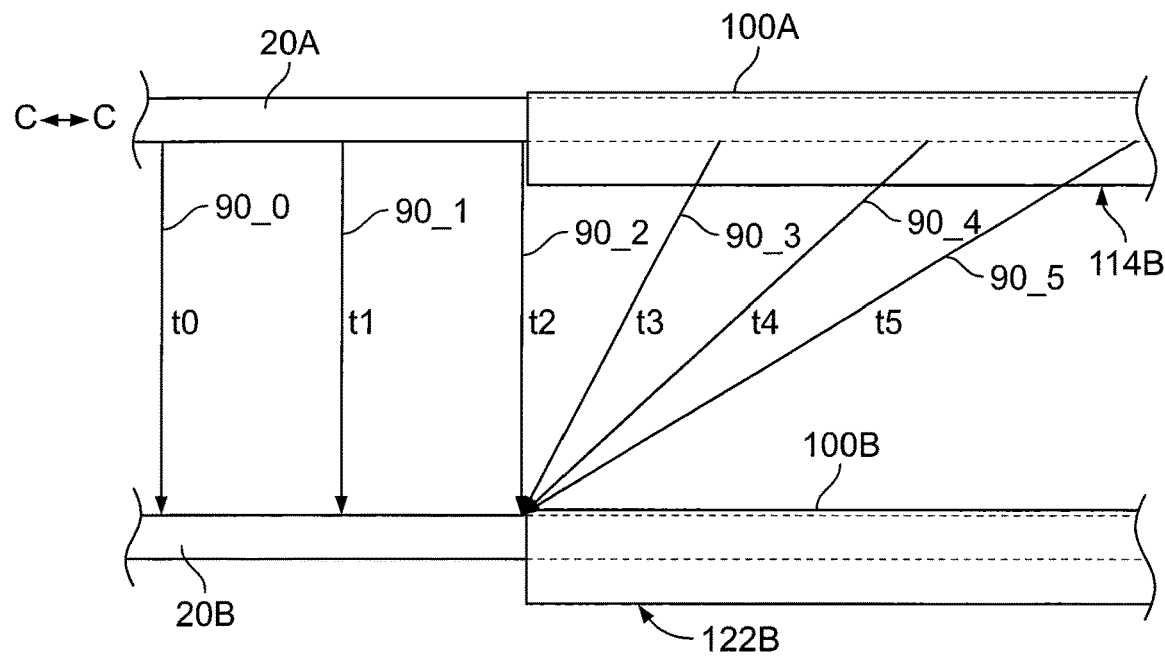
FIG. 2 is a schematic side view of an arc travelling between two conductors that include conventional protective covers.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The term "monolithic" means an object that is a single, unitary piece formed or composed of a material without joints or seams.

Figure 3A:
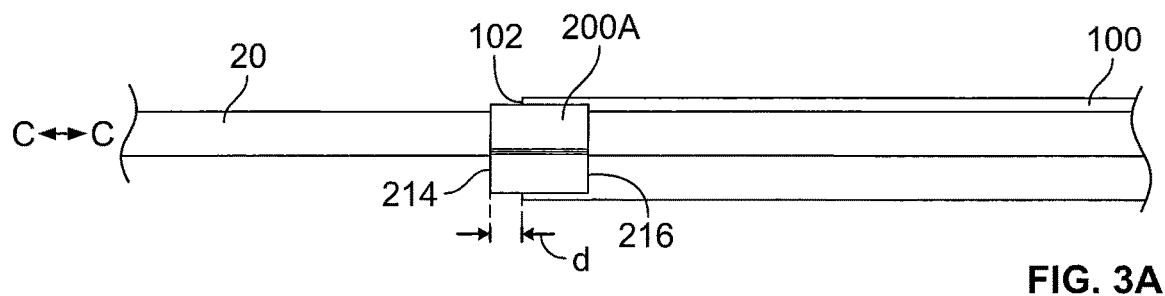
FIG. 3A is a schematic side view of an arc diverter on a conductor with a cut-away view of an insulator cover according to some embodiments of the present invention.
Figure 3B:
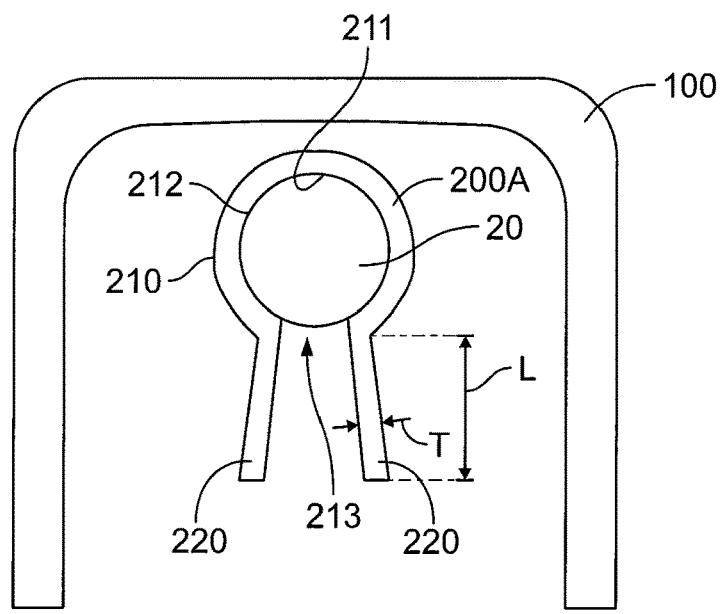
FIG. 3B is a schematic partial end view of an arc diverter on a conductor having an insulator cover thereon according to some embodiments of the present invention.

Reference is now made to FIG. 3A, which is a partial schematic side view of an arc diverter on a conductor with a cut-away view of an insulator cover and to FIG. 3B, which is a schematic partial end view of an arc diverter on a conductor having an insulator cover thereon, according to some embodiments of the present invention. A conductor 20 may include an electrical conductor 20 that is a component of a power distribution system that includes low voltage, medium voltage and/or high voltage electrical power and/or distribution components. Some embodiments provide that portions of the conductor 20 may be covered with an insulator cover 100 as described herein. As illustrated, the insulator cover 100 is illustrated with a cutaway view. For example, the insulator cover 100 may be present at or near locations in which the conductor 20 is supported by one or more supports, such as, for example, insulators on support structures.

According to some embodiments of the present invention, an arc diverter 200A may be positioned on the conductor 20 at a location corresponding to an edge 102 and/or transition portion of the insulator cover 100. In some embodiments, the arc diverter 200A may extend along the conductor and beyond the edge 102 of the insulator cover 100. For example, a first or outer edge 214 of the arc diverter 200A may extend from under the insulator cover 100 to a position that is at a distance d from the edge 102 of the insulator cover 100. In some embodiments, the value of the distance d that the outer edge 214 of the arc diverter 200A extends from under the insulator cover 100 may depend on the operating voltage and/or currents corresponding to the power distribution system. Some embodiments provide that the value of the distance d is in a range from about 0.75 inches to about 2.0 inches, however, such embodiments are nonlimiting. For example, the distance d may be less that 0.75 inches and/or greater than 2.0 inches. In this manner, the extending portion of the arc diverter 200A may be exposed (e.g., not covered by the insulator cover 100).

The arc diverter 200A may include a second or inner edge 216 that is covered by the insulator cover 100. In some embodiments, the position of the inner edge 216 relative to the edge 102 of insulator cover 100 may be a factor of the overall length of the arc diverter 200A, which may be the distance between the outer edge 214 and the inner edge 216 of the arc diverter 200A. Although schematically illustrated as being generally orthogonal to an axis C-C of the conductor 20, the outer and/or inner edges 214, 216 may be tapered and/or rounded in one or more directions.

In some embodiments, the arc diverter 200A may include an axially extending channel 211 with an axially extending bottom opening or open portion 213 (FIG. 3B). The axially extending channel 211 may be substantially shaped and dimensioned like the outer surface of the conductor 20 and is configured to receive the conductor 20 via the extending bottom opening 213. Some embodiments provide that, when the arc diverter 200A is installed onto the conductor 20, the opening is in contact with or exposes the conductor 20. In this manner, in the event an electrical arc is applied to the conductor 20 where the arc diverter 200A is installed, the arc diverter may spread the arc over a greater surface area of the conductor and, in some embodiments, may act as a sacrificial component by shielding the conductor 20 from the direct prolonged electrical arc.

Referring to FIG. 3B, the arc diverter 200A may include an engagement portion 210 that is configured to engage and cover a portion of the conductor 20 and an extension portion 220 that is configured to extend below the engagement portion 210. In some embodiments, the engagement portion 210 of the arc diverter 200A includes an inner contact surface 212 that is configured to contact the outer surface of the conductor 20 when installed thereon. In some embodiments, the extension portion 220 is configured to extend below the conductor 20 a distance L. In some embodiments, the value of the distance L that the extension portion 210 of the arc diverter 200A extends below the conductor 20 may depend on the operating voltage and/or currents corresponding to the power distribution system. Some embodiments provide that the value of the distance L is in a range from about 1 inches to about 2 inches, however, such embodiments are nonlimiting. For example, the distance L may be less than 1 inch and/or more than 2 inches.

In some embodiments, the arc diverter 200A is electrically conductive and includes one or more materials selected from the group including stainless steel, copper, tungsten, aluminum, conductive plastics and/or composites, and/or alloys thereof, among others. Although illustrated schematically as a generally monolithic composition, the arc diverter 200A may include multiple layers that may include one or more materials described herein. In some embodiments, the thickness T of arc diverter material may be in a range from 0.04 inches to about 0.25 inches, depending on the may depend on the operating voltage and/or currents corresponding to the power distribution system, and/or the dimensions of the conductors 20 used therein. For example, the thickness T may be less than 0.04 inches and/or more than 0.25 inches in some embodiments.

Figure 4:
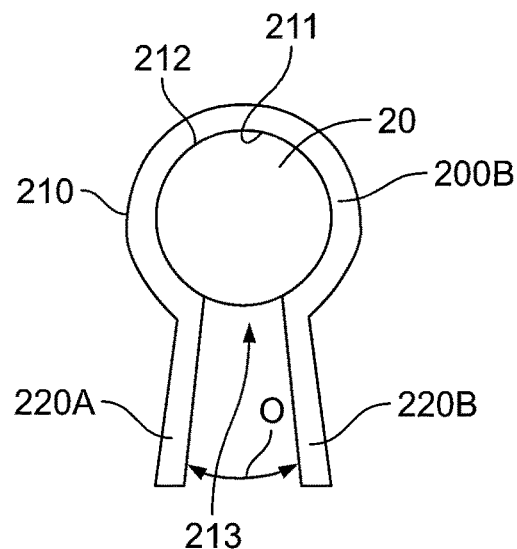
FIG. 4 is a schematic partial end view of a resilient arc diverter on a conductor according to some embodiments of the present invention.

Brief reference is now made to FIG. 4, which is a schematic partial end view of a resilient arc diverter on a conductor according to some embodiments of the present invention. As illustrated, the arc diverter 200B is installed on the conductor 20 such that the engagement surface 212 of the engagement portion 210 is in contact with an outer surface of the conductor 20. Some embodiments provide that the engagement surface 212 contacts the outer surface of the conductor 20 over more than 180° around the conductor 20. In some embodiments, the arc diverter 200B includes a resilient property such that installing the arc diverter 200B is performed by applying a separating force O to open the gap corresponding to the narrow point between the two sides of the extension portion 220A, 220B. Once the gap is sufficiently large to receive the conductor 20 and the arc diverter 200B is placed on the conductor 20, the resilient material in the arc diverter 200B will cause the arc diverter to spring back to a position in which the engagement portion 210 engages the conductor 20.

Figure 5A:
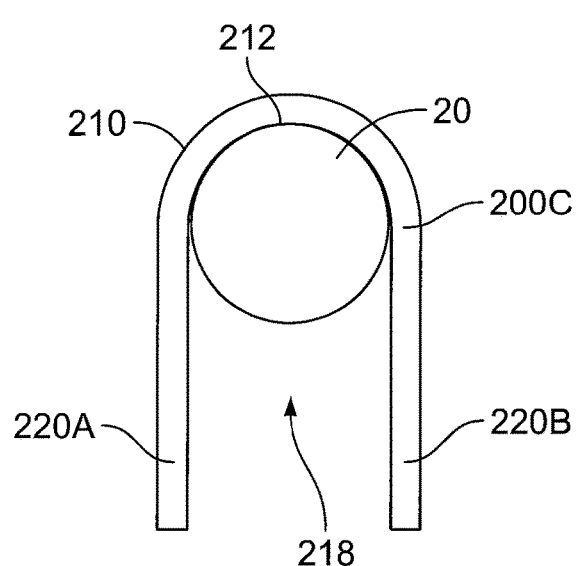
FIGS. 5A and 5B are schematic partial end views of a deformable arc diverter in pre-deformed and installed configurations respectively, on a conductor according to some embodiments of the present invention.
Figure 5B:
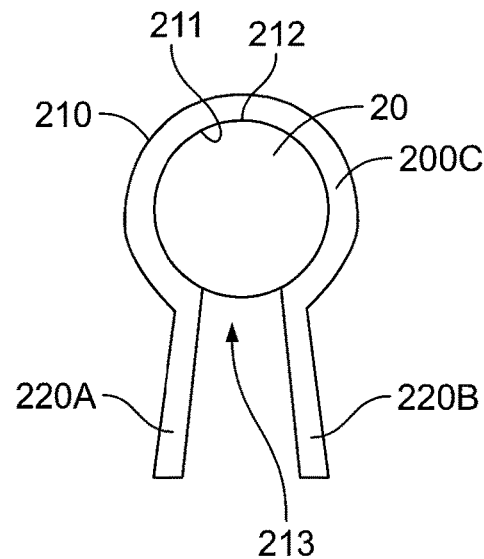

In some applications, the size and/or material requirements may render a resilient arc diverter 200B impractical. As such, brief reference is now made to FIGS. 5A and 5B, which are schematic partial end views of a deformable arc diverter 200C in pre-deformed and installed (post-deformed) configurations respectively, on a conductor according to some embodiments of the present invention. As illustrated in FIG. 5A, the arc diverter 200C in a pre-deformed state may include an opening 218 that is sufficiently large to receive the conductor 20 without the application of any separating force to the two sides of the extension portions 220A, 220B. For example, in the pre-deformed state, the engagement portion 210 may contact the conductor 20 over less than half (i.e., less than 180°) of the radial surface thereof.

Once the pre-deformed arc diverter 200C is positioned on the conductor 20, a deformation operation may be performed to compress the arc diverter 200C onto the conductor 20. In some embodiments, engagement portion 210 may be deformed to cause the engagement surface 212 of the arc diverter 200 to contact the conductor 20 over more than half (i.e., more than 180°) of the radial surface thereof. Additionally, the deformation operation may cause the extension portions 220A and 220B to become closer to one another. Although illustrated as occurring across the entire length of the arc diverter 200C, some embodiments provide that the deformation operation may only be performed at one or more discreet points along the length of the arc diverter 200C. In some embodiments, deforming the arc diverter 200C may be accomplished using a mechanical, electrical and/or hydraulic compression tool that is configured to deform at least a portion of the arc diverter 200C.

Reference is now made to FIG. 6, which is a schematic side view of multiple arc diverters on a conductor with a cut-away view of an insulator cover according to some embodiments of the present invention. In some embodiments, the insulator cover 100 includes a main or central body section 112 and legs 120A, 120B that extend from the main body section 112. The main body section 112 may correspond to the location that the conductor 20 is supported by a support structure 22, such as an insulator. In such embodiments, multiple arc diverters 200 may be installed at the various transition points corresponding to the insulator cover 100. For example, arc diverters 200 may be installed at each end of the insulator cover 100 corresponding to the outer edges of the legs 120. In such embodiments, the arc diverters 200 may extend from the outer edges of the legs 120 some distance d, as described above.

More specifically, each electrically conductive arc diverter 200 may be elongated in an axial direction dl that is parallel to the center axis C-C of the electrical cable 20 and may be attached to an outer surface of the electrical cable 20. One arc diverter 200 may include a first terminal end 214 and a second terminal end 216 with the second end 216 positioned below and covered by the insulator cover 100 (or the first leg portion 120A) and the first end 214 spaced apart from a first terminal end 115 of the insulator cover 100 (e.g., by the distance d as described above). In some embodiments, another arc diverter 200 may be positioned with the second terminal end 216 thereof positioned below and covered by the insulator cover 100 (or the second leg portion 120B) and the first terminal end 214 of the arc diverter 200 spaced apart from a second terminal end 117 of the insulator cover 100 (e.g., by the distance d as described above).

In some embodiments, arc diverters 200 may be installed at the transition points between each leg 120 in the main body section 112. In such embodiments, the arc diverters 200 may extend some distance d (as described above) into the main body section 112 and beyond the legs 120 towards the support structure 22.

More specifically, a first transition point 119 may be defined between the first leg portion 120A and the central portion 112 of the insulator cover 100 and a second transition point 121 may be defined between the second leg portion 120B and the central portion 112 of the insulator cover 100. One arc diverter 200 may be positioned with the second terminal end 216 thereof positioned below and covered by the first leg portion 120A and the first terminal end 214 of the arc diverter 200 positioned below and covered by the central portion 112 of the insulator cover 100. In some embodiments, another arc diverter 200 may be positioned with the second terminal end 216 thereof positioned below and covered by the second leg portion 120B and the first terminal end 214 of the arc diverter 200 positioned below and covered by the central portion 112 of the insulator cover 100. It will be appreciated that one or both of the arc diverters 200 at the transition points 119, 121 may be omitted in some embodiments.

While some embodiments provide that the arc diverters 200 are positioned only at the ends and/or at transition points corresponding to the legs 120, in some embodiments, the arc diverters 200 may extend the full length of the legs 120. For example, continuous arc diverters 200D are illustrated in FIG. 7, which is a schematic side view of continuous arc diverters on a conductor with a cut-away view of an insulator cover according to some embodiments of the present invention.

More specifically, the arc diverter 200D may include first and second opposite terminal ends 214, 216. One arc diverter 200D may be positioned with the first terminal end 214 thereof spaced apart from the first terminal end 115 of the insulator cover 100 in the axial direction dl and with the second terminal end 216 of the arc diverter 200D positioned below and covered by the central portion 112 of the insulator cover 100. In some embodiments, another arc diverter 200D may be positioned with the first terminal end 214 thereof spaced apart from the second terminal end 117 of the insulator cover 100 in the axial direction and with the second terminal end 216 of the arc diverter 200D positioned below and covered by the central portion 112 of the insulator cover 100.

Figure 8A:
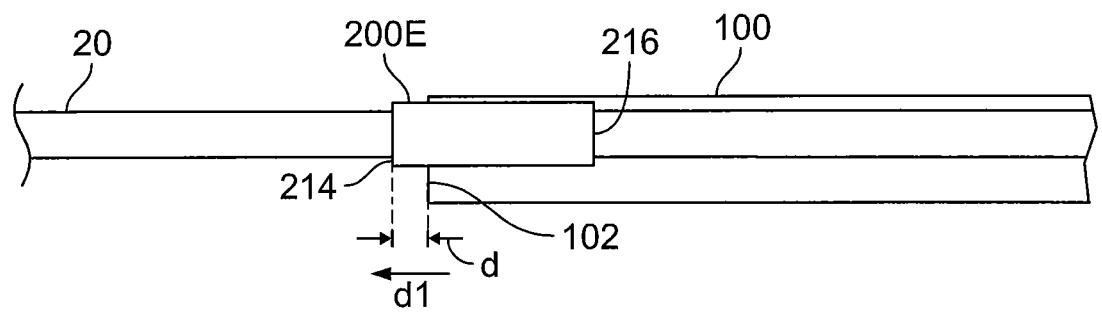
FIG. 8A is a schematic side view of an armor rod arc diverter on a conductor with a cut-away view of an insulator cover according to some embodiments of the present invention.
Figure 8B:
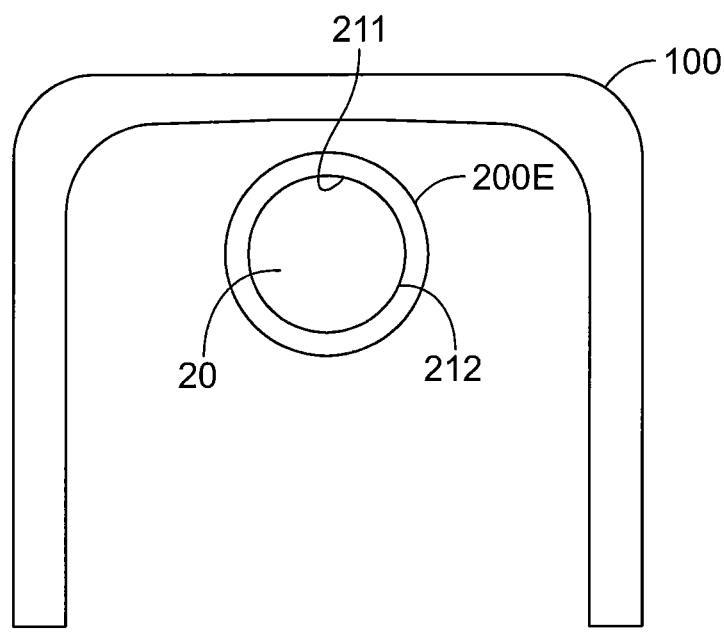
FIG. 8B is a schematic partial end view of an armor rod arc diverter on a conductor having an insulator cover thereon according to some embodiments of the present invention.

As provided above, embodiments described thus far have generally included an omega shape including an engagement portion 210 and an extension portion 220. In such embodiments, the engagement portion 210 generally includes a channel 211 defining an engagement surface 212 that contacts the conductor 20 over less than all of the conductor surface. For example, the angular engagement of the omega shaped arc diverter 200 may engage greater than 180° and less than 360° of the conductor surface. Such embodiments, however, are nonlimiting. For example, reference is now made to FIG. 8A, which is a schematic side view of an armor rod arc diverter 200E on a conductor with a cut-away view of an insulator cover, and FIG. 8B, which is a schematic partial end view of an armor rod arc diverter 200E on a conductor having an insulator cover thereon according to some embodiments of the present invention. Some embodiments provide that the armor rod arc diverter 200E may include a generally tubular sleeve that is configured to cover a portion of the conductor 20. As illustrated, the arc diverter 200 may extend along the conductor 20 and beyond the edge 102 of the insulator cover 100. For example, an outer edge 214 of the arc diverter 200E may extend from under the insulator cover 100 to a position that is at a distance "d" from the edge 102 of the insulator cover 100.

In contrast with the omega shaped arc diverter described above, an armor rod arc diverter 200E may engage the conductor 20 a full 360° around the conductor surface. In some embodiments, the armor rod arc diverter 200E may include multiple strands of spiral shaped electrically conductive wires that may be wound around an existing conductor 20. In some embodiments, the armor rod arc diverter 200E may include an electrically conductive fabric and/or mesh that may be wound around and/or attached to the conductor 20.

Figure 9:
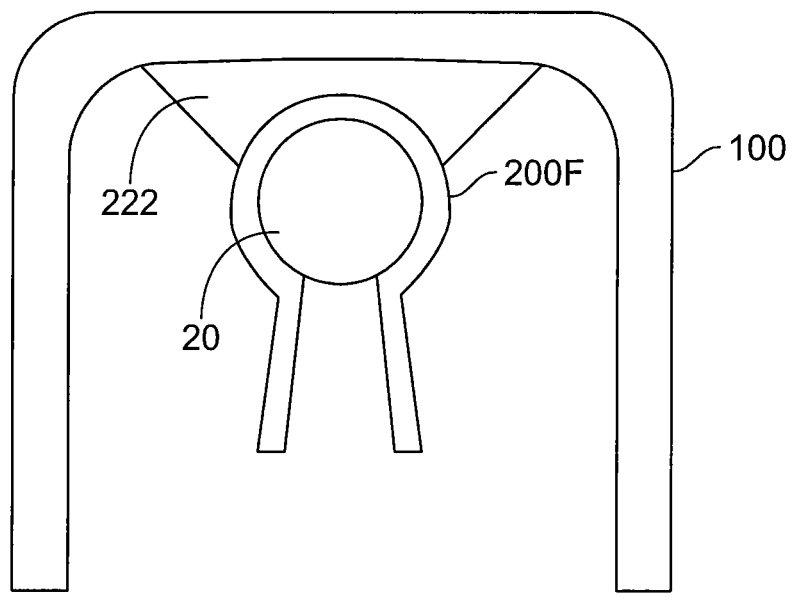
FIG. 9 is a schematic partial end view of an insulator cover with an integrally included arc diverter on a conductor according to some embodiments of the present invention.

While the arc diverter 200 is discussed above in terms of a separate component from the insulator cover 100, some embodiments provide that an integrated device may be provided in which the arc diverter component 200 is integral with the insulator cover 100. For example, brief reference is now made to FIG. 9, which is a schematic partial end view of an insulator cover with an integrally included arc diverter on a conductor according to some embodiments of the present invention. As illustrated, the arc diverter 200F may be integrally provided with an insulator cover 100. For example, an insulator cover support structure 222 may be included that positions and/or supports the arc diverter 200F within the insulator cover 100. In some embodiments, the insulator cover support structure 222 may be a molded portion in which the arc diverter 200F is molded into the insulator cover 100. Some embodiments provide that the insulator cover support structure 222 is a separate structural element that may be added to the insulator cover 100 and/or the arc diverter 200F to integrate the insulator cover 100 and the arc diverter 200F into a single integrated component. For example, the insulator cover 100 and the arc diverter 200F may be attached to one another at the factory, by an installer, and/or onsite, among others.

In some embodiments, the arc diverter 200F and the insulator cover 100 may be provided as an assembly or kit in which the components can be discreetly provided and assembled prior to and/or in conjunction with installation thereof. In some embodiments, the arc diverter 200F and the insulator cover 100 may be provided as a single unitary device to be installed as provided.

Figure 10:
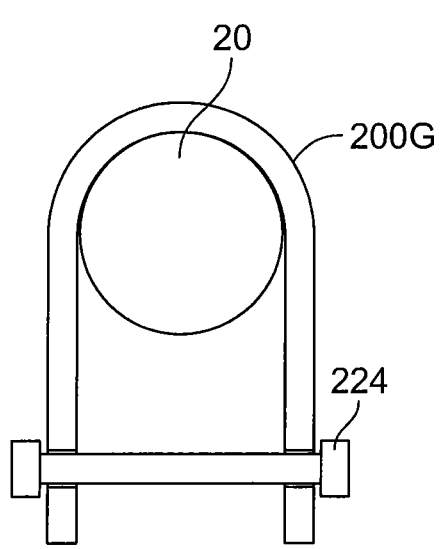
FIG. 10 is a schematic partial end view of a mechanically fastened arc diverter on a conductor according to some embodiments of the present invention.

Brief reference is now made to FIG. 10, which is a schematic partial end view of a mechanically fastened arc diverter on a conductor according to some embodiments of the present invention. Some embodiments provide that the arc diverter 200G may be mechanically fastened to the conductor 20 using one or more fasteners 224 and/or types thereof. Examples of such fasteners include, but are not limited to, screws, bolts, nuts, rivets and/or clamps, among others.

Figure 11:
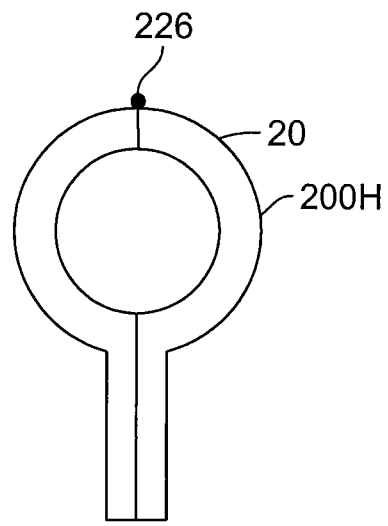
FIG. 11 is a schematic partial end view of a hinged two part arc diverter on a conductor according to some embodiments of the present invention.

Brief reference is now made to FIG. 11, which is a schematic partial end view of a hinged two part arc diverter on a conductor according to some embodiments of the present inventions. In some embodiments, the arc diverter 200H may include the two-part arc diverter that includes separate portions that may be movably and/or fixedly joined to one another. For example, in some embodiments, a movable attachment point 226, such as a hinge, may be provided. In some embodiments the movable attachment point 226 may include a slot and tongue arrangement, among others. Although not illustrated, the lower portion of the arc diverter 200 may also be attached using one or more mechanical fastener technologies.

Figure 12A:
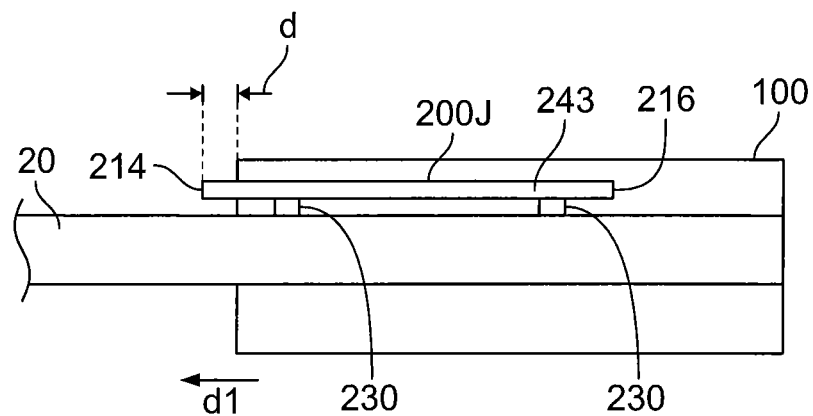
FIG. 12A is a schematic side view of a parallel top mounted arc diverter on a conductor with a cut-away view of an insulator cover according to some embodiments of the present invention.
Figure 12B:
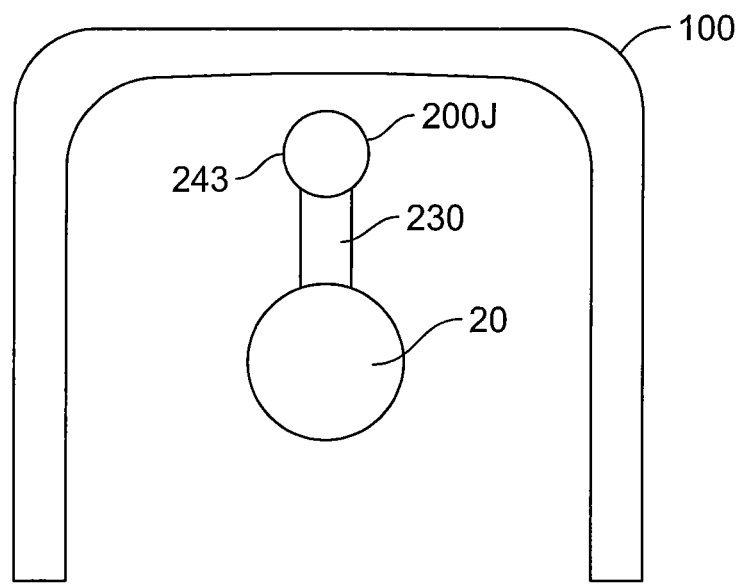
FIG. 12B is a schematic partial end view of a parallel top mounted arc diverter on a conductor having an insulator cover thereon according to some embodiments of the present invention.

Reference is now made to FIG. 12A, which is a schematic side view of a parallel top mounted arc diverter on a conductor with a cut-away view of an insulator cover and FIG. 12B, which is a schematic partial end view of a parallel top mounted arc diverter on a conductor having an insulator cover thereon according to some embodiments of the present invention. In some embodiments, the arc diverter 200J may include a substantially elongated electrically conductive member 243 that is electrically conductively attached to the conductor 20 in a position that is spaced apart from the conductor 20 in a substantially parallel arrangement. In such embodiments, the arc diverter 200J may be attached to the conductor 20 using an arc diverter support 230 that is configured to hold the electrically conductive member 243 in a position relative to the conductor 20. In some embodiments, the arc diverter support 230 may include one or more clamps, brackets and/or standoffs. Similar to the arc diverters 200 discussed above, a parallel top mounted arc diverter 200 may extend from under the insulator cover 100 some distance d.

Figure 13A:
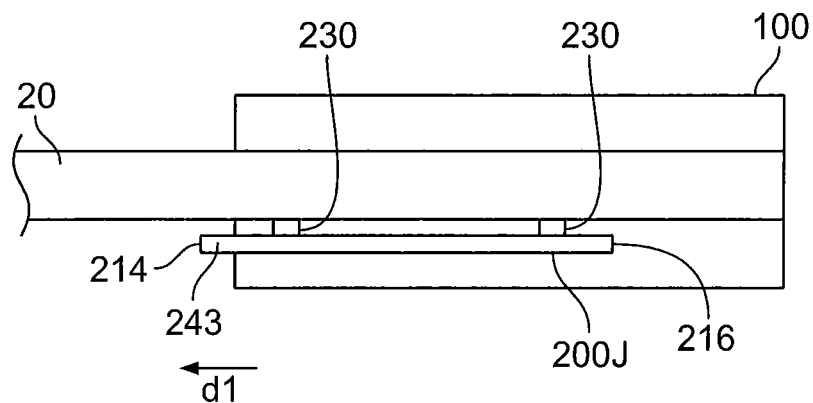
FIG. 13A is a schematic side view of a parallel bottom mounted arc diverter on a conductor with a cut-away view of an insulator cover according to some embodiments of the present invention.
Figure 13B:
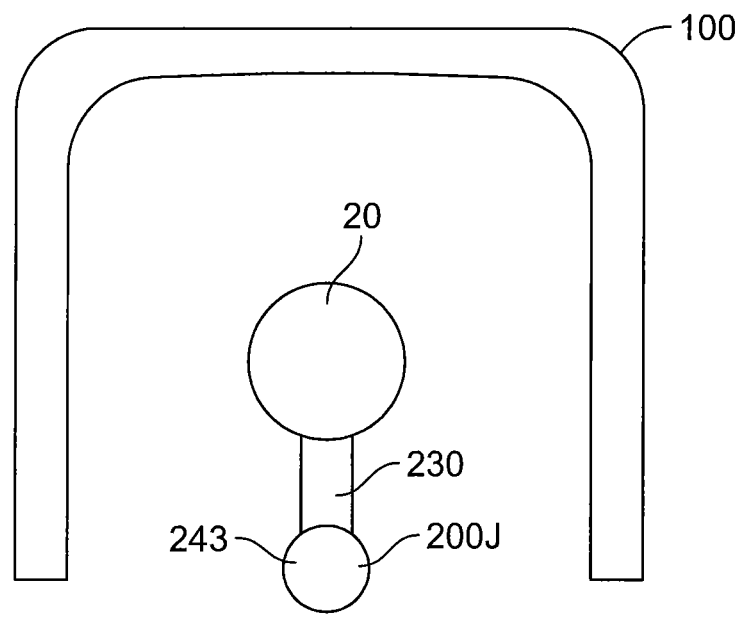
FIG. 13B is a schematic partial end view of a parallel bottom mounted arc diverter on a conductor having an insulator cover thereon according to some embodiments of the present invention.
Figure 14A:
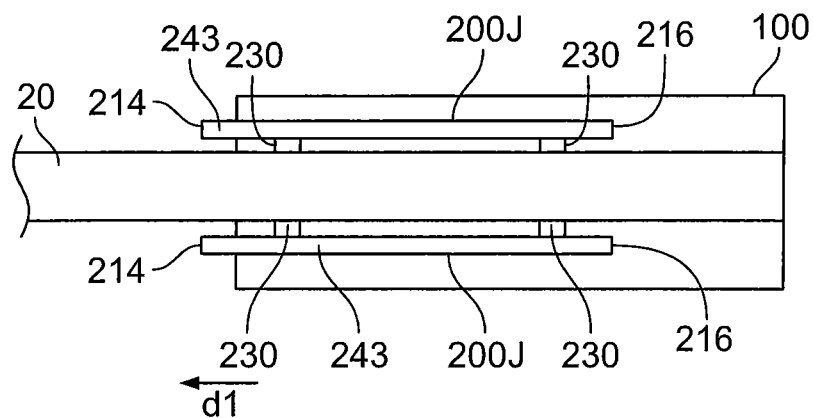
FIG. 14A is a schematic side view of parallel top and bottom mounted arc diverters on a conductor with a cut-away view of an insulator cover according to some embodiments of the present invention.
Figure 14B:
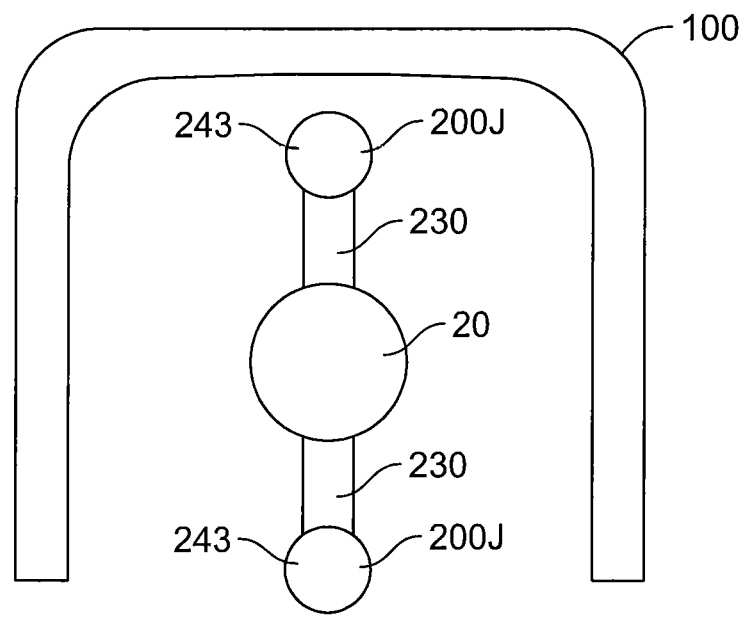
FIG. 14B is a schematic partial end view of parallel top and bottom mounted arc diverter on a conductor having an insulator cover thereon according to some embodiments of the present invention.

In some embodiments, the position and/or quantity of arc diverters 200 may be adjusted based on the relative position(s) of adjacent conductors 20. For example as illustrated in FIGS. 13A and 13B, the arc diverter 200 may be a parallel bottom mounted arc diverter 200. Similarly, as illustrated in FIGS. 14A and 14B, the arc diverter 200 may include parallel top and bottom mounted arc diverters 200 on a conductor 20 with a cut-away view of an insulator cover according to some embodiments of the present invention.

Figure 15:
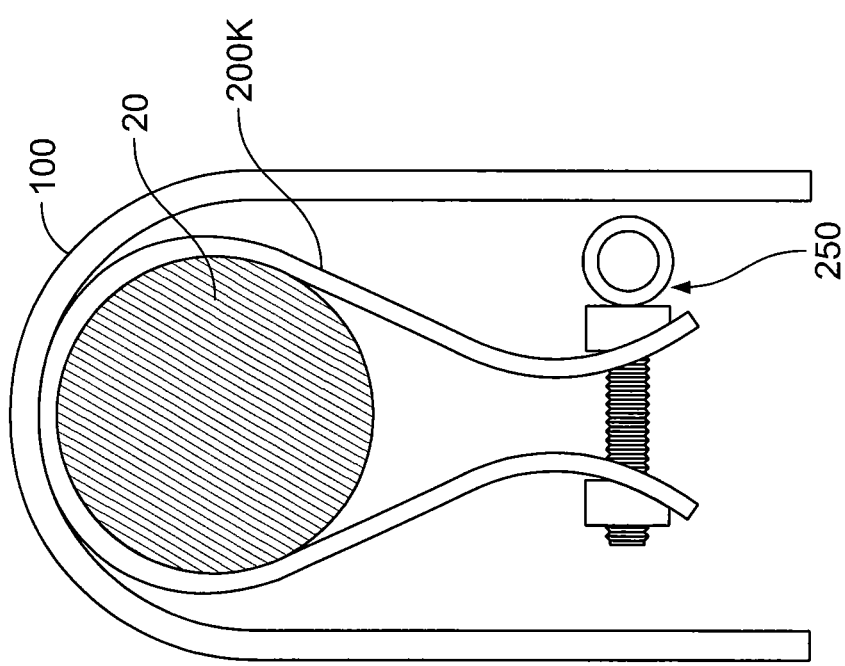
FIG. 15 is a schematic partial end view of a mechanically fastened arc diverter on a conductor with the arc diverter integrated with and/or molded into an insulator cover according to some embodiments of the present invention.

FIG. 15 illustrates an arc diverter 200K that is directly adjacent or integrated with the insulator cover 100. For example, the insulator cover 100 may be molded over the arc diverter 200K or the arc diverter 200K may be press fit into the insulator cover 100. The arc diverter 200K may be compressed by a fastener or securing device 250 to facilitate holding the conductor 20.

Figure 16:
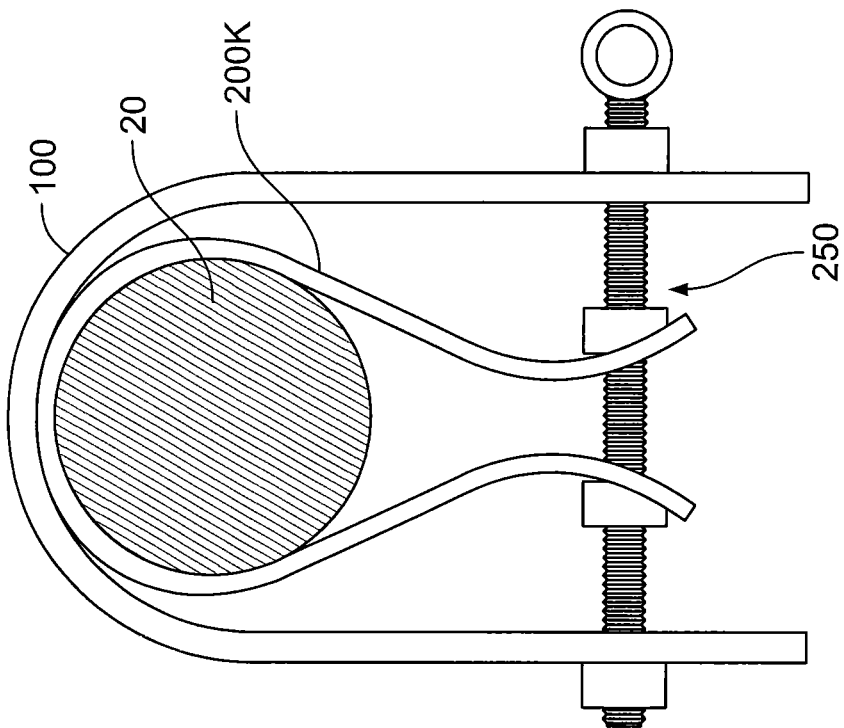
FIG. 16 is a schematic partial end view of an arc diverter on a conductor with the arc diverter optionally integrated with and/or molded into an insulator cover and with the arc diverter coupled to the insulator cover according to some embodiments of the present invention.

FIG. 16 illustrates an arc diverter 200L that is directly adjacent or integrated with the insulator cover 100. For example, the insulator cover 100 may be molded over the arc diverter 200K or the arc diverter 200K may be press fit into the insulator cover 100. Additionally or alternatively, a fastener or securing device 255 may be coupled to the insulator cover 100 to hold the arc diverter 200L in place. For example, the fastener 255 may extend through the body 110 of the insulator cover or may extend through apertures 150a defined in the clips 150 (FIG. 1). This configuration may also help hold the insulator cover 100 in position on the insulator 50 and/or the conductor 20.

Figure 17:
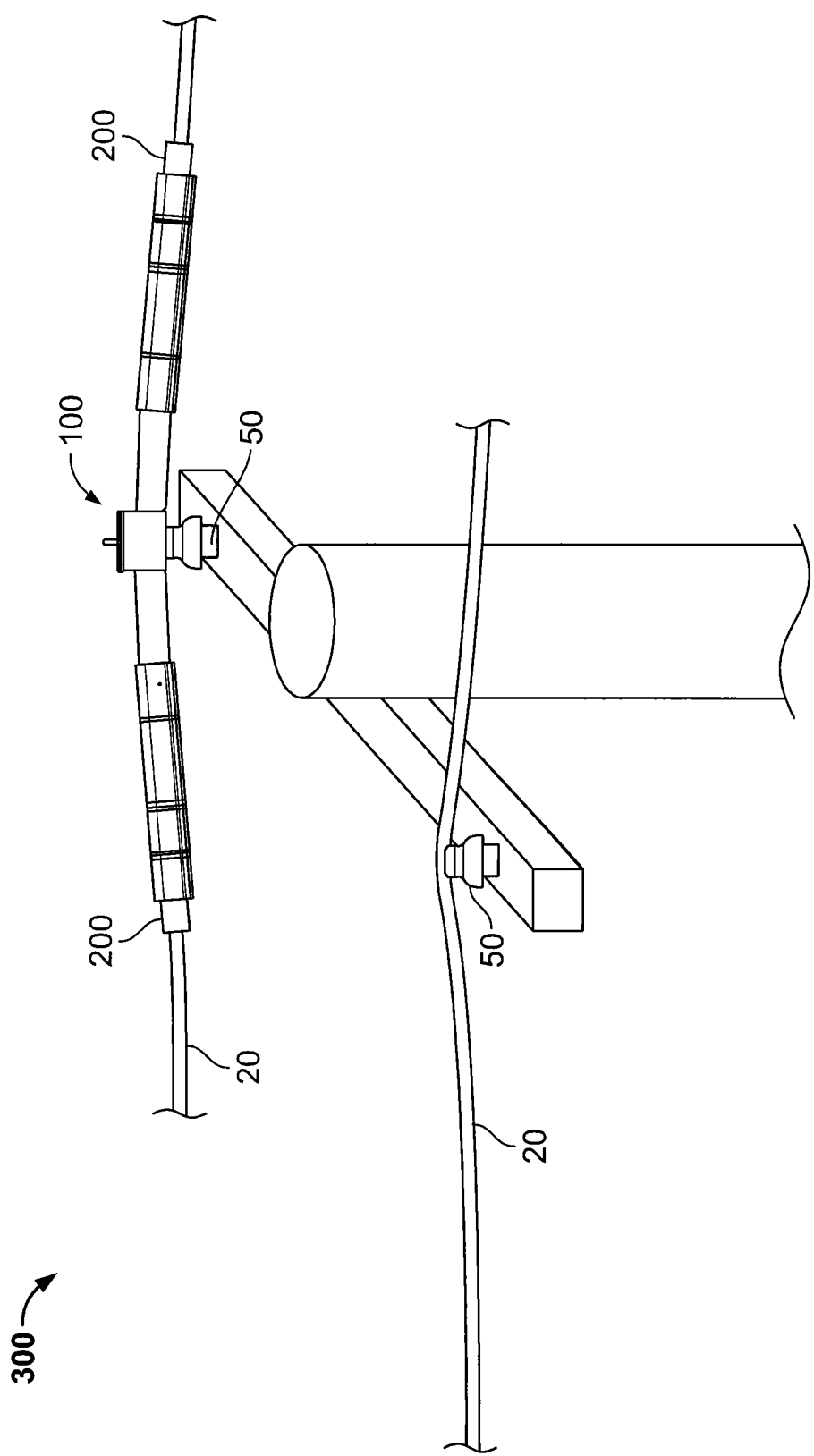
FIG. 17 illustrates a protective cover assembly including an insulator cover and one or more arc diverters with the insulator cover covering a conductor and an insulator of a power distribution system according to some embodiments of the present invention.

FIG. 17 illustrates a power distribution system including the conductor 20, an insulator 50, an insulator cover 100 and arc diverters 200. As described above, embodiments of the present invention are directed an assembly or kit 300 including the insulator cover 100 and one or more of the arc diverters as described herein.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A protective cover assembly for an electrical cable mounted on an insulator, the protective cover assembly comprising:
    an insulator cover including a cover body covering the electrical cable and the insulator; and
    an electrically conductive arc diverter that is elongated in an axial direction that is parallel to a center axis of the electrical cable and that is attached to an outer surface of the electrical cable at a portion of the electrical cable that is covered by the insulator cover such that a portion of the arc diverter is positioned below and covered by the insulator cover and another portion of the arc diverter extends past a terminal end of the insulator cover with an end of the arc diverter being spaced apart from the terminal end of the insulator cover in the axial direction;
    wherein the arc diverter comprises:
        an engagement portion that directly contacts a portion of the outer surface of the electrical cable; and
        an extension portion that extends downwardly away from the engagement portion, and
    wherein the electrical cable is exposed at an open portion of the arc diverter that is between the engagement portion and the extension portion of the arc diverter.

2. A protective cover assembly for an electrical cable mounted on an insulator, the protective cover assembly comprising:
    an insulator cover including a cover body covering the electrical cable and the insulator; and
    an electrically conductive arc diverter that is elongated in an axial direction that is parallel to a center axis of the electrical cable and that is attached to an outer surface of the electrical cable at a portion of the electrical cable that is covered by the insulator cover such that a portion of the arc diverter is positioned below and covered by the insulator cover and another portion of the arc diverter extends past a terminal end of the insulator cover with an end of the arc diverter being spaced apart from the terminal end of the insulator cover in the axial direction;
    wherein the end of the arc diverter is spaced apart from the terminal end of the insulator cover in the axial direction by a distance that is in a range from about 0.75 inches to about 2.0 inches.

3. The assembly of claim 2 wherein the arc diverter comprises:
    an engagement portion that is configured to directly contact a portion of the outer surface of the electrical cable; and
    an extension portion that is configured to extend downwardly away from the engagement portion.

4. The assembly of claim 3 wherein the electrical cable is exposed at an open portion of the arc diverter that is between the engagement portion and the extension portion of the arc diverter.

5. The assembly of claim 1 wherein the engagement portion surrounds more than half a circumference of the electrical cable.

6. The assembly of claim 1 wherein the arc diverter comprises a resilient material.

7. The assembly of claim 1 wherein the arc diverter comprises a deformable portion that is configured to be compressively deformed to engage the outer surface of the electrical cable.

8. The assembly of claim 1 wherein the arc diverter comprises stainless steel.

9. The assembly of claim 1 wherein:
    the end of the arc diverter is a first terminal end of the arc diverter;
    the arc diverter includes a second terminal end that is opposite the first terminal end of the arc diverter;
    the second terminal end of the arc diverter is positioned below and covered by the insulator cover.

10. The assembly of claim 9 wherein:
    the arc diverter is a first arc diverter;
    the end of the insulator cover is a first terminal end of the insulator cover;
    the insulator cover includes a second terminal end that is opposite the first terminal end of the insulator cover;
    the assembly comprises a second arc diverter having first and second opposite terminal ends;
    the second arc diverter is elongated in the axial direction and is attached to the outer surface of the electrical cable at a portion of the electrical cable that is covered by the insulator cover such that the second terminal end of the second arc diverter is positioned below and covered by the insulator cover and the first terminal end of the second arc diverter is spaced apart from the second terminal end of the insulator cover in the axial direction.

11. The assembly of claim 10 wherein the first and second arc diverters are spaced apart from one another in the axial direction.

12. The assembly of claim 10 wherein:
    the assembly comprises a third arc diverter having first and second opposite terminal ends;

the insulator cover includes a central portion covering the insulator and a leg portion extending laterally away from the central portion and covering a portion of the electrical cable;

the third arc diverter is elongated in the axial direction and is attached to the outer surface of the electrical cable at a portion of the electrical cable that is covered by the insulator cover such that the third arc diverter extends past a transition point of the insulator cover defined between the central portion and the leg portion of the insulator cover such that the first terminal end of the third arc diverter is positioned below and covered by the central portion of the insulator cover and the second terminal end of the third arc diverter is positioned below and covered by the leg portion of the insulator cover.

13. The assembly of claim 12 wherein:

the leg portion of the insulator cover is a first leg portion of the insulator cover;

the insulator cover includes a second leg portion opposite the first leg portion and extending laterally away from the central portion of the insulator cover and covering a portion of the electrical cable;

the transition point of the insulator cover is a first transition point that is defined between the central portion of the insulator cover and the first leg portion of the insulator cover;

the assembly comprises a fourth arc diverter having first and second opposite ends;

the fourth arc diverter is elongated in the axial direction and is attached to the outer surface of the electrical cable at a portion of the electrical cable that is covered by the insulator cover such that the fourth arc diverter extends past a second transition point of the insulator cover defined between the central portion and the second leg portion of the insulator cover such that the first terminal end of the fourth arc diverter is positioned below and covered by the central portion of the insulator cover and the second terminal end of the fourth arc diverter is positioned below and covered by the second leg portion of the insulator cover.

14. The assembly of claim 1 wherein:

the end of the arc diverter is a first terminal end of the arc diverter;

the arc diverter includes a second terminal end that is opposite the first terminal end;

the insulator cover includes a central portion covering the insulator and a leg portion extending laterally away from the central portion and covering a portion of the electrical cable;

the arc diverter extends past a transition point of the insulator cover defined between the central portion and the leg portion of the insulator cover such that the second terminal end of the arc diverter is positioned below and covered by the central portion of the insulator cover.

15. The assembly of claim 14 wherein:

the arc diverter is a first arc diverter;

the end of the insulator cover is a first terminal end of the insulator cover;

the insulator cover includes a second terminal end that is opposite the first terminal end of the insulator cover;

the leg portion of the insulator cover is a first leg portion of the insulator cover;

the insulator cover includes a second leg portion opposite the first leg portion and extending laterally away from the central portion of the insulator cover and covering a portion of the electrical cable;

the transition point of the insulator cover is a first transition point that is defined between the central portion of the insulator cover and the first leg portion of the insulator cover;

the assembly comprises a second arc diverter having first and second opposite terminal ends;

the second arc diverter is elongated in the axial direction and is attached to the outer surface of the electrical cable at a portion of the electrical cable that is covered by the insulator cover such that the first terminal end of the second arc diverter is spaced apart from the second terminal end of the insulator cover in the axial direction and the second arc diverter extends past a second transition point of the insulator cover defined between the central portion and the second leg portion of the insulator cover such that the second terminal end of the second arc diverter is positioned below and covered by the central portion of the insulator cover.

16. The assembly of claim 1 wherein:

the insulator cover includes a cover body defining a cavity and an open bottom that communicates with the cavity;

the arc diverter is at least partially in the cavity.

17. The assembly of claim 1 wherein the arc diverter is spaced apart from the insulator cover in a direction perpendicular to the center axis of the electrical cable.

18. The assembly of claim 1 wherein the arc diverter is integral with and/or molded into the insulator cover.

19. The assembly of claim 1 wherein the arc diverter is coupled to the insulator cover.

20. A method of providing an arc protection of an electrical cable that is mounted on an insulator, the method comprising:

providing an insulator cover including a cover body covering the electrical cable and the insulator; and installing an electrically conductive arc diverter that is elongated in an axial direction that is parallel to a center axis of the electrical cable by attaching the arc diverter to an outer surface of the electrical cable at a portion of the electrical cable that is covered by the insulator cover such that a portion of the arc diverter is positioned below and covered by the insulator cover and another portion of the arc diverter extends past an end of the insulator cover with an end of the arc diverter being spaced apart from the end of the insulator cover in the axial direction;

wherein the arc diverter comprises:

an engagement portion that directly contacts a portion of the outer surface of the electrical cable after the installing step; and an extension portion that extends downwardly away from the engagement portion, and wherein, after the installing step, the electrical cable is exposed at an open portion of the arc diverter that is between the engagement portion and the extension portion of the arc diverter.

21. A device for diverting a traveling electrical arc, the device comprising:

an electrically conductive arc diverter that is elongated in an axial direction that is parallel to a center axis of an electrical cable and that is configured to be attached to an outer surface of the electrical cable at a portion of the electrical cable that is covered by an insulator cover in an installed position, wherein, in the installed position, a portion of the arc diverter is positioned below and covered by the insulator cover and another portion of the arc diverter extends past a terminal end of the insulator cover such that an end of the arc diverter is spaced apart from the terminal end of the insulator cover in the axial direction;

wherein, in the installed position, the end of the arc diverter is spaced apart from the terminal end of the insulator cover in the axial direction by a distance that is in a range from about 0.75 inches to about 2.0 inches.

\* \* \* \* \*

UNITED STATES PATENT AND TRADEMARK OFFICE
CERTIFICATE OF CORRECTION

PATENT NO. : 10,593,446 B2
APPLICATION NO. : 15/495456
DATED : March 17, 2020
INVENTOR(S) : Senthil A. Kumar Page 1 of 1

It is certified that error appears in the above-identified patent and that said Letters Patent is hereby corrected as shown below:

On the Title Page

Item (56) References Cited, OTHER PUBLICATIONS, Column 2:
Please correct "US20171029146" to read -- US2017/029146 --

In the Specification

Column 2, Line 35:
Please correct "t042" to read -- t0-t2 --

Signed and Sealed this
Fourteenth Day of July, 2020

Andrei Iancu
*Director of the United States Patent and Trademark Office*